(12) United States Patent
Geary et al.

(10) Patent No.: US 10,324,726 B1
(45) Date of Patent: Jun. 18, 2019

(54) PROVIDING INSTRUCTION CHARACTERISTICS TO GRAPHICS SCHEDULING CIRCUITRY BASED ON DECODED INSTRUCTIONS

(71) Applicant: Apple Inc., Cupertino, CA (US)

(72) Inventors: Michael A. Geary, Round Rock, TX (US); Brian K. Reynolds, Austin, TX (US); Terence M. Potter, Austin, TX (US)

(73) Assignee: Apple Inc., Cupertino, CA (US)

( * ) Notice: Subject to any disclaimer, the term of this patent is extended or adjusted under 35 U.S.C. 154(b) by 72 days.

(21) Appl. No.: 15/429,982

(22) Filed: Feb. 10, 2017

(51) Int. Cl.
*G06F 9/30* (2018.01)
*G06F 9/38* (2018.01)
*G06F 12/0897* (2016.01)
*G06F 12/0875* (2016.01)

(52) U.S. Cl.
CPC .......... *G06F 9/3836* (2013.01); *G06F 9/3016* (2013.01); *G06F 9/30043* (2013.01); *G06F 12/0875* (2013.01); *G06F 12/0897* (2013.01); *G06F 2212/452* (2013.01)

(58) Field of Classification Search
CPC .. G06F 9/3836; G06F 9/30043; G06F 9/3016; G06F 12/0875; G06F 12/0897; G06F 2212/452; G06F 9/3851; G06F 12/0871; G06F 16/172; G06F 2212/6042; G06F 12/0806; G06F 2212/604; G06T 15/005; G06T 1/20; G06T 15/04; G06T 15/80; G06T 2210/52; G06T 15/503; G09G 5/363
See application file for complete search history.

(56) References Cited

U.S. PATENT DOCUMENTS

| 5,337,415 A | 8/1994 | DeLano et al. |
| 8,001,361 B2 | 8/2011 | Luick |
| 2008/0074433 A1* | 3/2008 | Jiao ........................ G06T 15/005 345/522 |

(Continued)

OTHER PUBLICATIONS

Kenji Minagawa, et al., "Pre-Decoding Mechanism for Superscalar Architecture," IEEE Pacific Rim Conference on Communications, Computers and Signal Processing, May 9-10, 1991, pp. 21-24.

*Primary Examiner* — Xilin Guo
(74) *Attorney, Agent, or Firm* — Meyertons, Hood, Kivlin, Kowert & Goetzel, P.C.

(57) ABSTRACT

Techniques are disclosed relating to scheduling graphics instructions for execution on different types of execution units based on characteristics of decoded and cached graphics instruction. In some embodiments, a graphics unit includes multiple different types of execution units that are configured to execute different types of instructions (e.g., different units for datapath, sample, load/store, etc.). In some embodiments, the graphics unit stores decoded instructions in an instruction cache in at least one cache level, along with information specifying characteristics of the instructions. The characteristics may be stored at clause granularity and may indicate the type of instructions in each clause (e.g., corresponding to which type of execution unit is configured to execute the instructions). In some embodiments, scheduling circuitry is configured to access the information and select instructions from the instruction cache to send to ones of the plurality of execution units based on the stored information.

20 Claims, 6 Drawing Sheets

(56) References Cited

U.S. PATENT DOCUMENTS

| | | | |
|---|---|---|---|
| 2013/0166881 A1 | 6/2013 | Choquette et al. | |
| 2015/0100763 A1* | 4/2015 | Holm | G06F 9/30145 |
| | | | 712/210 |
| 2016/0188491 A1* | 6/2016 | Apodaca | G06F 12/126 |
| | | | 711/133 |

* cited by examiner

PROVIDING INSTRUCTION CHARACTERISTICS TO GRAPHICS SCHEDULING CIRCUITRY BASED ON DECODED INSTRUCTIONS

BACKGROUND

Technical Field

This disclosure relates generally to graphics processors and more specifically to scheduling instructions for execution based on characteristics of decoded instructions.

Description of the Related Art

Graphics processing often involves executing the same instruction in parallel for different graphics elements (e.g., pixels or vertices). Further, the same group of graphics instructions is often executed multiple times (e.g., to perform a particular function for different graphics elements or for the same graphics elements at different times). Graphics processors (GPUs) are often included in mobile devices such as cellular phones, wearable devices, etc., where power consumption and processor area are important design concerns.

Many GPUs include multiple different types of execution units. For example, the GPU may include one or more types of execution units for datapath instructions, a sample unit, an interpolation unit, a load unit, a store unit, etc. Further, clause-based execution may allow clauses of instructions to be executed multiple different times for different input data, (without re-fetching the instructions if clauses are cached). It may be difficult, however, for GPU scheduling circuitry to efficiently determine when to dispatch instructions to the different types of execution units using information traditionally available to scheduling circuitry.

SUMMARY

Techniques are disclosed relating to scheduling graphics instructions for execution on different types of execution units based on characteristics of decoded graphics instruction.

In some embodiments, a graphics unit includes multiple different types of execution units that are configured to execute different types of instructions (e.g., different units for datapath, sample, load/store, etc.). In some embodiments, the graphics unit stores decoded instructions in an instruction cache in at least one cache level, along with information specifying characteristics of the instructions. The characteristics may be stored at clause granularity and may indicate the type of instructions in each clause (e.g., corresponding to which type of execution unit is configured to execute the instructions). The graphics unit may build up streams of instructions, with information from decoded instructions stored for active streams, while also storing program counter information for inactive streams. In some embodiments, scheduling circuitry is configured to access the information and select instructions from the instruction cache (and/or input data for the instructions) to send to ones of the plurality of execution units based on the stored information. The disclosed techniques may improve performance of the scheduler, in various embodiments, relative to traditional techniques.

Figure 1A:
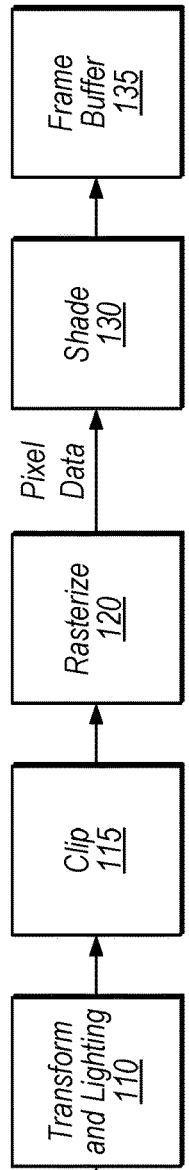
FIG. 1A is a block diagram illustrating an exemplary graphics processing flow.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

DETAILED DESCRIPTION

Figure 1B:
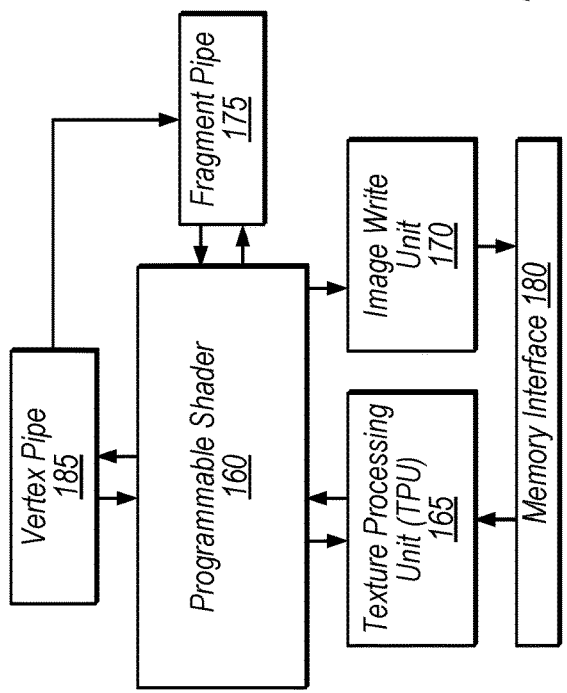
FIG. 1B is a block diagram illustrating one embodiment of a graphics unit.
Figure 2:
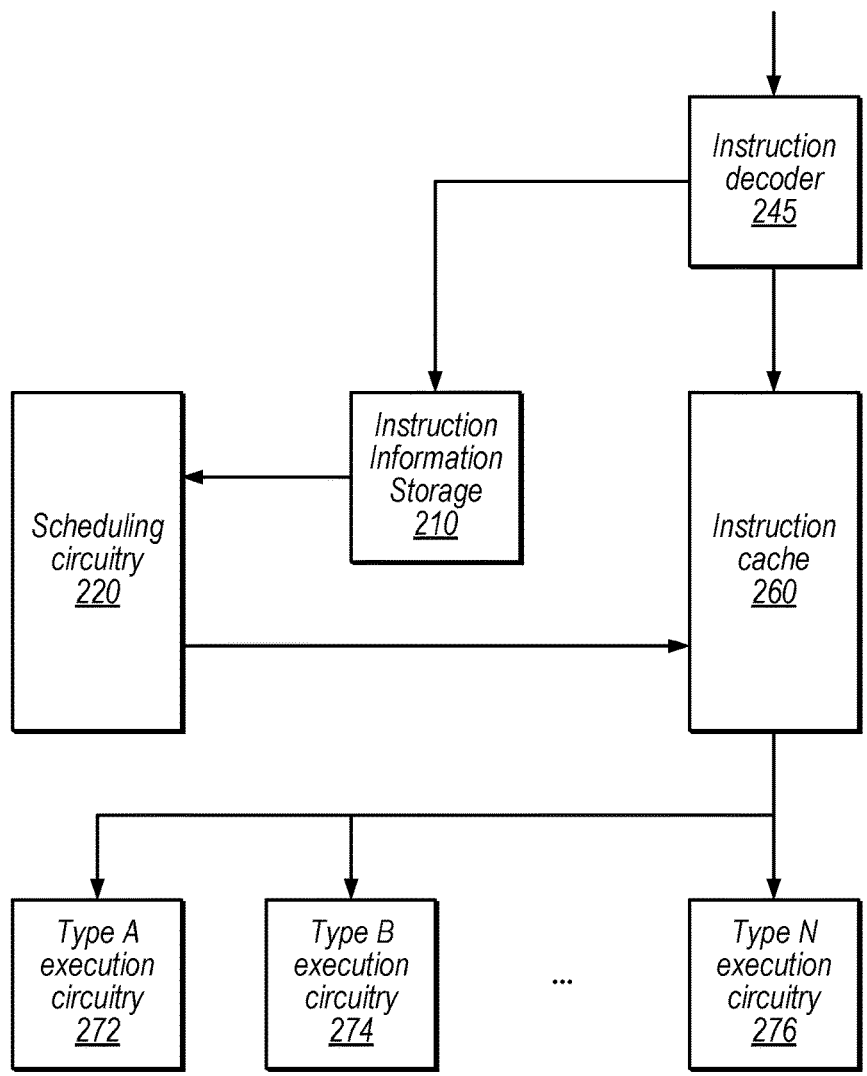
FIG. 2 is a block diagram illustrating exemplary circuitry that includes scheduling circuitry and storage for instruction information relating to decoded instructions in an instruction cache, according to some embodiments.
Figure 3:
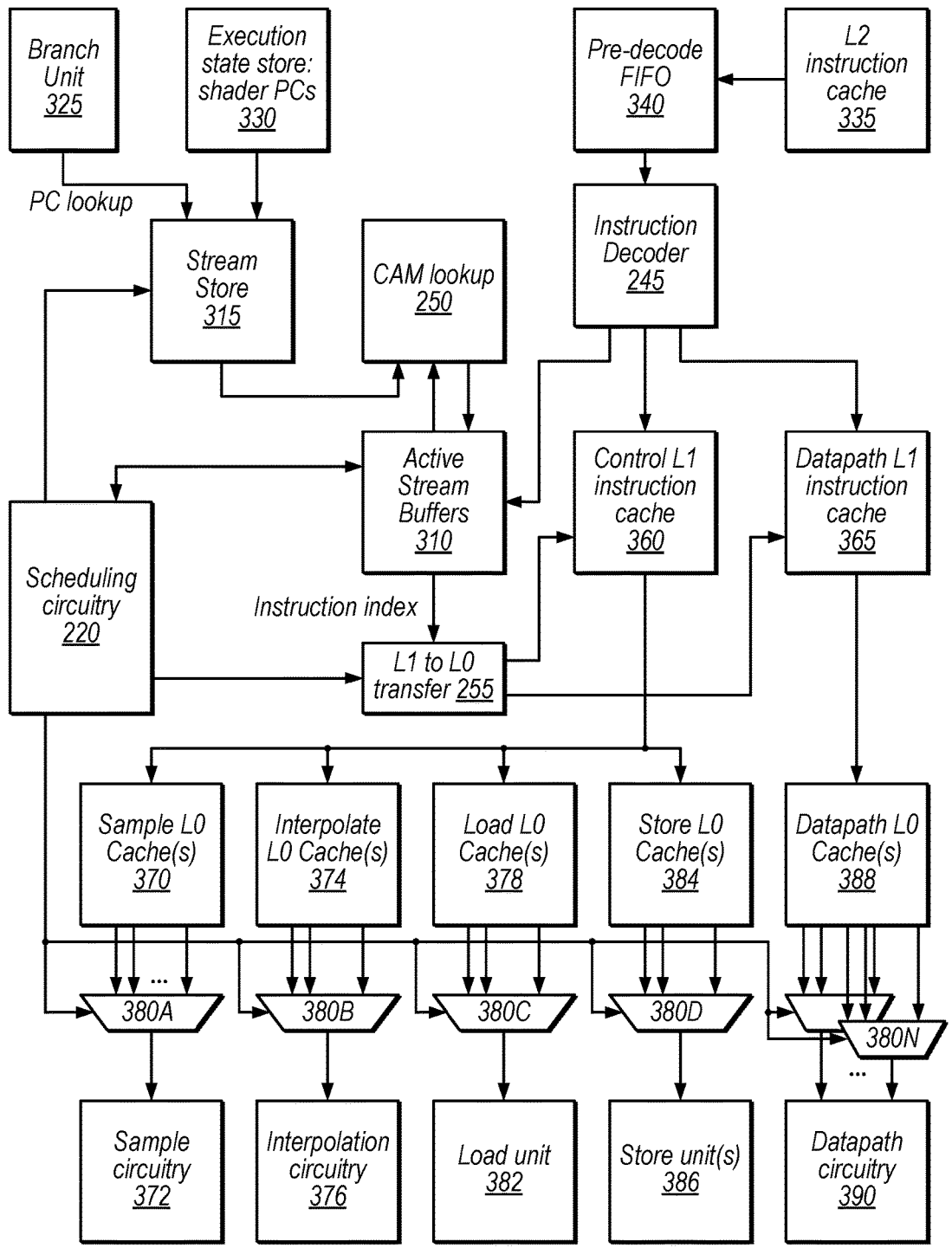
FIG. 3 is a block diagram illustrating a more detailed example of the circuitry of FIG. 2, according to some embodiments.
Figure 4:
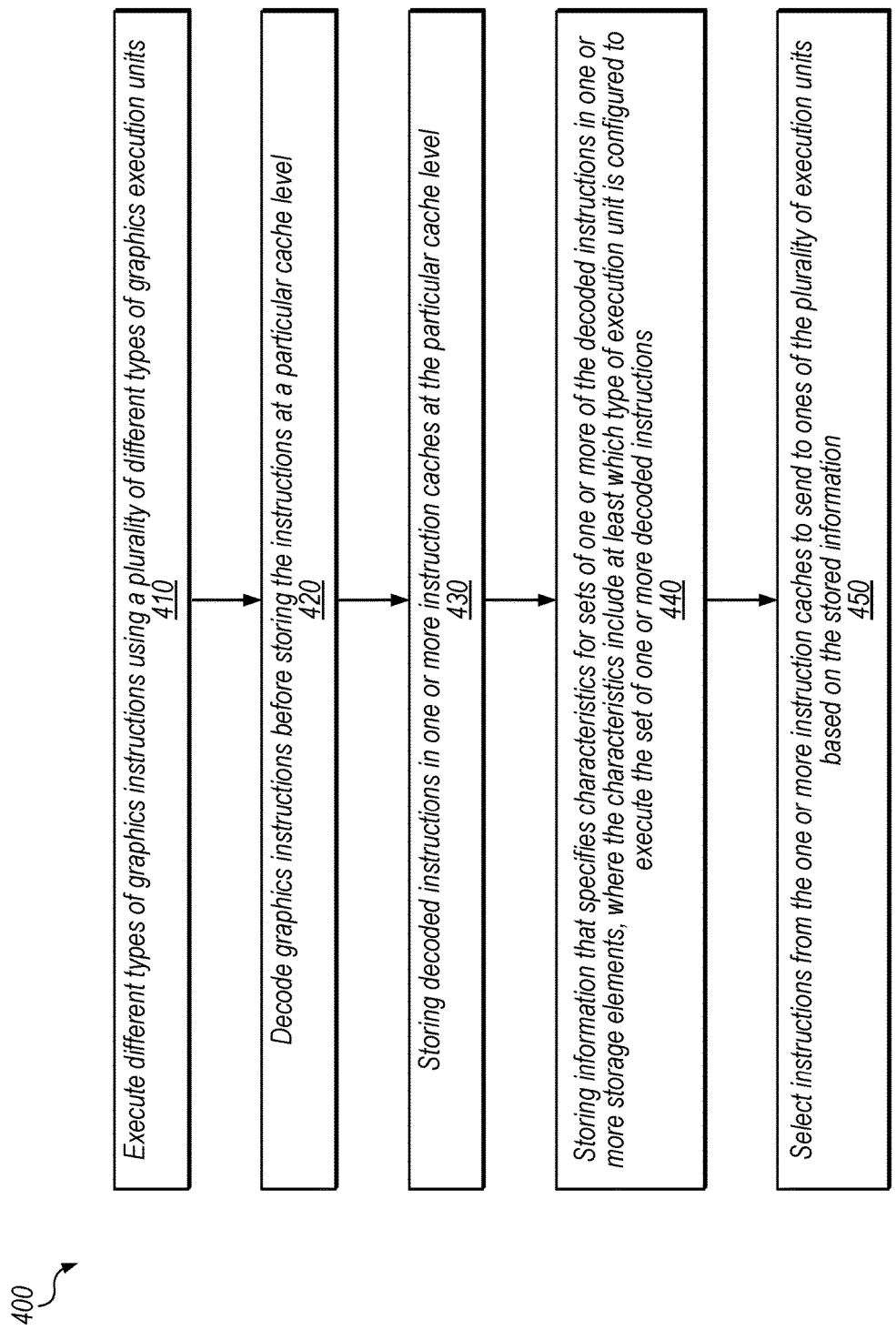
FIG. 4 is a flow diagram illustrating an exemplary method for selecting instructions to send to different types of execution units for execution, according to some embodiments.
Figure 5:
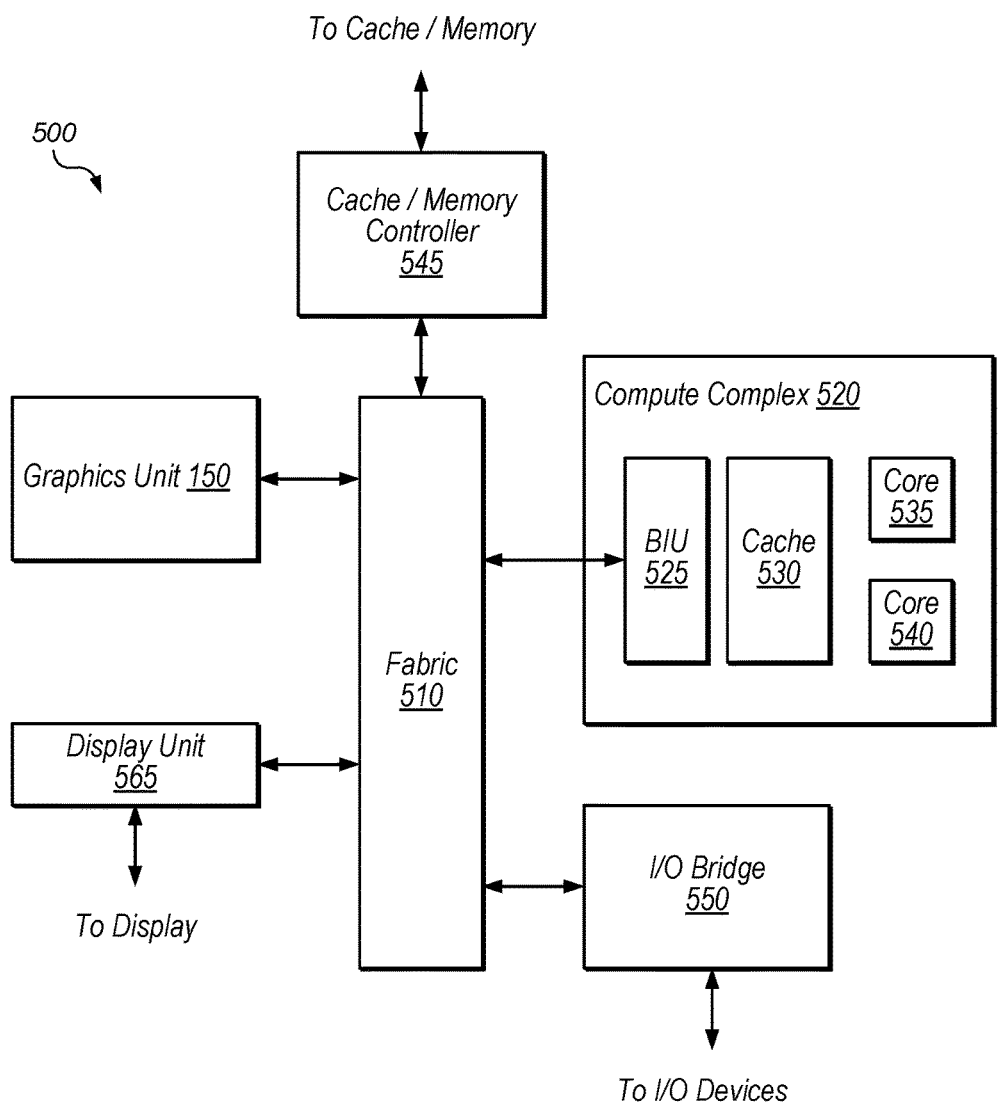
FIG. 5 is a block diagram illustrating an exemplary device, according to some embodiments.
Figure 6:
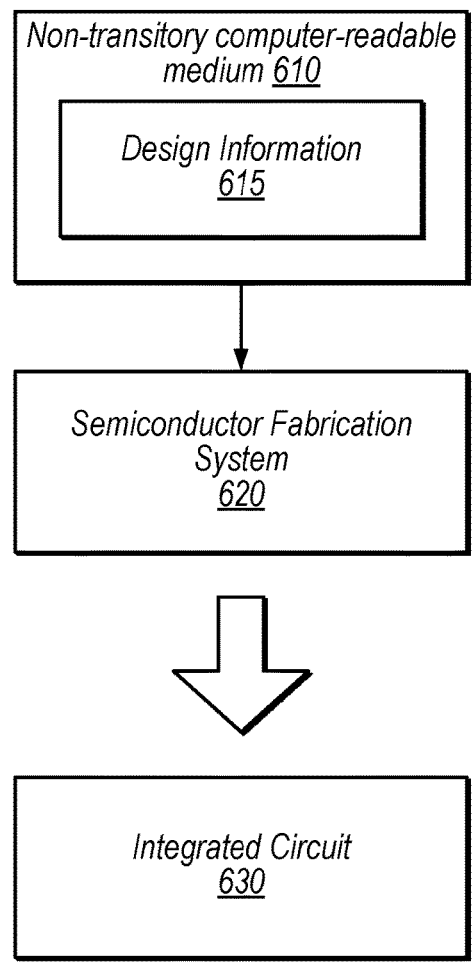
FIG. 6 is a block diagram illustrating an exemplary computer-readable medium, according to some embodiments.

This disclosure initially describes, with reference to FIGS. 1A-1B, an overview of a graphics processing flow and an exemplary graphics unit. FIGS. 2-4 illustrate techniques for caching decoded instructions and storing information indicating characteristics of the decoded instructions. FIG. 5 illustrates an exemplary device and FIG. 6 illustrates an exemplary computer-readable medium. In various embodiments, the disclosed techniques may facilitate efficient scheduling of instructions for different types of execution units which may improve performance and/or reduce power consumption, relative to traditional techniques.

Graphics Processing Overview

Referring to FIG. 1A, a flow diagram illustrating an exemplary processing flow 100 for processing graphics data is shown. In one embodiment, transform and lighting step 110 may involve processing lighting information for vertices received from an application based on defined light source locations, reflectance, etc., assembling the vertices into polygons (e.g., triangles), and/or transforming the polygons to the correct size and orientation based on position in a three-dimensional space. Clip step 115 may involve discarding polygons or vertices that fall outside of a viewable area. Rasterize step 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer) and/or ignoring one or more fragments (e.g., if they are covered by other objects). Shade step 130 may involve altering pixel components based on lighting, shadows, bump mapping, translucency, etc. Shaded pixels may be assembled in a frame buffer 135. Modern GPUs typically include programmable shaders that allow customization of shading and other processing steps by application developers. Thus, in various embodiments, the exemplary steps of FIG. 1A may be performed in various orders, performed in parallel, or omitted. Additional processing steps may also be implemented.

Referring now to FIG. 1B, a simplified block diagram illustrating one embodiment of a graphics unit 150 is shown. In the illustrated embodiment, graphics unit 150 includes programmable shader 160, vertex pipe 185, fragment pipe 175, texture processing unit (TPU) 165, image write unit 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 and/or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 and/or programmable shader 160 to generate fragment data. Vertex pipe 185 and/or fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and/or TPU 165. Programmable shader 160 may be configured to perform vertex processing tasks on vertex data which may include various transformations and/or adjustments of vertex data. Programmable shader 160, in the illustrated embodiment, is also configured to perform fragment processing tasks on pixel data such as texturing and shading, for example. Programmable shader 160 may include multiple execution instances for processing data in parallel.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write unit (IWU) 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

In various embodiments, a programmable shader such as programmable shader 160 may be coupled in any of various appropriate configurations to other programmable and/or fixed-function elements in a graphics unit. The exemplary embodiment of FIG. 1B shows one possible configuration of a graphics unit 150 for illustrative purposes.

Exemplary Pre-decode Techniques

FIG. 2 is a block diagram illustrating exemplary processing elements in programmable shader 160, according to some embodiments. In the illustrated embodiment, programmable shader 160 includes instruction information storage 210, scheduling circuitry 220, instruction decoder 245, instruction cache 260, and multiple different types of execution circuitry 272-276.

In some embodiments, elements 210, 245, and 260 are included in an instruction stream controller (ISC) unit. In some embodiments, the ISC is configured to provide instruction data to execution circuitry 272-276 and to provide instruction information for streams of instructions to scheduling circuitry 220. The ISC may fetch instructions from memory and decoder 245 may decode them sufficiently to provide scheduling hints (e.g., based on characteristics of decoded instructions) to the scheduling circuitry 220 via instruction information storage 210. Therefore, instruction cache 260, in some embodiments, is configured to store at least partially decoded instructions. This may allow the scheduling circuitry 220 to make efficient scheduling decisions, e.g., by avoiding issuing instructions to execution units that are busy. Scheduling circuitry 220, in some embodiments, is configured to issue instructions and input data to execution units for processing.

In some embodiments, the ISC is configured to manage instructions hierarchically. In some embodiments, the smallest granularity of management is an instruction, which may be grouped into clauses, which may in turn be grouped into streams.

A "clause" is a group of instructions that, once invoked, executes atomically such that all instructions in the clause execute (i.e., once a clause has been invoked for execution, all instructions in the clause are executed, barring a condition such as a failed predicate condition, an exception, or other error). Clauses may include a single instruction, in some situations, but circuitry configured to perform clause-based execution ("clause-based execution circuitry") must be able to handle clauses that include a plurality of instructions. Thus, in some embodiments, clauses may contain varying numbers of instructions from a single instruction to a maximum number of supported instructions. The term "clause" may refer to the instructions themselves or may be used more generally to refer to both the instructions in the clause and corresponding input data, once input data has been assigned to the clause for execution (note that the same clause may be executed multiple times with different input data for the different invocations of the clause).

Therefore, in some embodiments, an execution unit to which a clause is issued for execution may be occupied for multiple cycles (depending on the number of instructions in the clause). Issuing instructions for execution may include sending the instructions to the correct execution unit (which may include a cache or buffer for instructions to that unit) and sending input data for the instructions in the clause to operate on, which may be stored in an operand cache (note that the input data may be for a single-instruction multiple-data (SIMD) group, in various embodiments such that one or more instructions in the clause are executed in parallel). In some embodiments, control flow instructions are generally not claused together, so control flow clauses may include a single instruction. One exception, in some embodiments, is interpolate/sample pairs of instructions which may be claused as a pair, e.g., because a sample instruction typically follows and depends on an interpolation operation.

A "stream" is a sequence of instruction clauses. The size of a stream may be limited by processor resources (e.g., the size of storage elements used to hold instructions and/or instruction information for the stream). When stream information is maintained, in some embodiments, the scheduling circuitry can query what instruction clause is up next for a thread group without having to wait for a fetch and decode. In some embodiments, stream storage is limited, and separate limits may be imposed for data flow instructions and data move or control flow instructions for each stream. In some embodiments, the ISC supports multiple streams, e.g., up to 16, 32, 64, etc. in various embodiments.

Note that in other embodiments, instruction information may be managed at other granularities than those discussed herein. Therefore, instruction characteristics may be determined and provided to a scheduler at various granularities, including instruction granularity or stream granularity, for example. Various disclosed embodiments discuss maintaining information about instruction characteristics at the clause granularity for illustrative purposes, but this is not intended to limit the scope of the present disclosure.

In various embodiments, the information maintained by the ISC may facilitate efficient scheduling by the scheduling circuitry 220, which may improve overall GPU performance and/or reduce power consumption.

FIG. 3 is a block diagram showing an exemplary embodiment of the circuitry of FIG. 2 in more detail. Similarly numbered elements in FIG. 3 may be configured as described above with reference to FIG. 2. In the illustrated embodiment, programmable shader 160 includes active stream buffers 310 (which may correspond to instruction information storage 210), stream store 315, scheduling circuitry 220, branch unit 325, execution state store 330, L2 instruction cache 335, pre-decode FIFO 340, instruction decoder 245, content addressable memory (CAM) lookup logic 250, L1 to L0 transfer circuitry 255, control L1 instruction cache 360, datapath L1 instruction cache 365, sample L0 cache(s) 370, interpolate L0 cache(s) 374, load L0 cache(s) 378, store L0 cache 384, datapath L0 cache(s) 388, multiplexers (MUXs) 380A-380N, sample circuitry 372, interpolation circuitry 376, load unit 382, store unit(s) 386, and database circuitry 390.

Elements 372, 376, 382, 386, and 390 are examples of different types of execution circuitry and may correspond to ones of elements 272-276 of FIG. 2. Sample circuitry 372, in some embodiments, includes a pipeline configured to perform sample operations (e.g., of a texture, based on provided coordinates). Interpolation circuitry 376, in some embodiments, includes a pipeline configured to perform interpolation operations, e.g., to generate texture coordinates for sampling operations. Given that texture and sampling operations are often performed as pairs, these instructions may be grouped into two-instruction clauses at the L1 level, in some embodiments. Load unit 382, in some embodiments, is configured to perform load operations to access data to be operated upon (e.g., to fetch data into a register file for processing by other execution units). Store unit(s) 386, in some embodiments, are configured to store data to one or more storage elements in a memory hierarchy. Multiple different types of storage units may be used to perform store operations for different types of data (e.g., image data, fragment data, etc.). Datapath circuitry 390, in some embodiments, includes pipelines configured to perform various arithmetic operations and may include a plurality of pipelines, each configured to perform single-instruction multiple-data (SIMD) operations. Each type of execution unit may be replicated or may include multiple pipelines, e.g., such that multiple different instructions of the same type may be executed in parallel. In some embodiments, the different types of execution units are configured to signal to scheduling circuitry 220 their respective status, e.g., how many instructions in their L0 caches are still to be executed, the number of busy stages in their pipelines, etc. This information may be used in conjunction with the active stream buffers 310 to determine which instructions to select next for sending to the execution units.

L0 caches 370, 374, 376, 384, and 388, in the illustrated embodiment, are configured to store instructions that scheduling circuitry 220 has sent to the corresponding execution unit. These caches may be buffers, in other embodiments. In various embodiments, the L0 caches store clauses of instructions such that clauses do not need to be re-transferred from an L1 instruction cache if they are still in the L0 cache when they are accessed again (e.g., to execute on different input data supplied by the scheduling circuitry 220). MUXs 380, in some embodiments, are configured to transfer instructions from the L0 cache for execution by the corresponding execution unit. For example, scheduling circuitry 220 may be configured to control these MUXs to select a particular clause in their corresponding L0 cache. Maintaining separate instruction caches for different types of execution units may reduce cache thrashing among these units. Thus, the L0 caches may allow significant instruction re-use by a given execution unit, e.g., without requiring instructions to be re-sent from one of the L1 caches 360 or 365. This may be especially helpful in the context of graphics processing, where the same clause of instructions may be executed multiple times using different input data (e.g., for different sets of pixels in a screen space).

Branch unit 325 and execution state store 330, in the illustrated embodiment, are configured to provide program counter (PC) information to stream store 315, which may use this information to generate information in active stream buffers 310, as discussed in further detail below.

Pre-decode FIFO 340, in some embodiments, is configured to store instructions from L2 instruction cache 335 until they are decoded (at least partially) by instruction decoder 245 and then stored in an appropriate L1 instruction cache. In some embodiments, FIFO 340 is configured to support multiple outstanding stream fetches and each pre-fetch may include multiple chunks of contiguous instruction data which may be returned out of order. In some embodiments, data returned from memory is accumulated so that stream processing can be performed in program order. Decode circuitry 245 may select one of the L1 instruction caches 360 and 365 for each instruction based on its opcode. As shown, decoder 245 is also configured to provide information to active stream buffers 310, which may be used by scheduling circuitry 220 to decide what instructions to send from L1 caches 360 and 365.

L1 instruction caches 360 and 365, in some embodiments, are configured to store decoded instructions until they are transferred to an L0 buffer or cache, e.g., as controlled by L1 to L0 transfer circuitry 255. Caches 360 and 365 may be random access memory (RAM)-based storages. The split L1 storage may reduce excessive cache misses caused by control and datapath instructions competing for L1 storage (known as thrashing), in some embodiments. In some embodiments, active stream buffers 310 are configured to act as a tag for L1 caches 360 and 365, using CAM lookup logic 350. In some embodiments, cache 365 is configured to store a particular number of bytes per stream, which may or may not different from the number of bytes per stream stored in cache 360. In some embodiments, although the instructions in the L1 caches are at least partially decoded, ones of the execution units may be configured to perform further decoding on instructions in their L0 caches prior to execution.

Stream store 315, in some embodiments, is configured to maintain a large set of PCs that can be referenced by the scheduling circuitry 220. Active stream buffers 310 are configured to store structures which describe characteristics of instructions in the instruction caches. These structures are discussed in further detail below. Stream store 315 and active stream buffers 310 will be described together below, in the content of building up information for an active stream starting with a PC.

When a stream begins as a PC is may be referred to as a "virtual stream buffer" (VSB) that has not been populated with fetched and pre-decoded instructions or instruction information. The first PCs may be sent to the ISC from an execution state cache. These PCs may be fetched and pre-decoded. In some embodiments, the fetched programs include a load shader instruction, which may cause an entry in the stream store 315 to be allocated. If the PC of the load shader instruction matches a previous PC, then the previously allocated entry may be referenced rather than allocating a new entry. The entries may be fully associative. VSBs may also be used when a loading program or shader program is too large to be contained in a single stream. For example, previously decoded streams that are replaced may be assigned VSBs. When a stream of instructions is terminated (e.g., due to exhaustion of descriptor resources or instruction storage space), the final PC that points to the next instruction may be stored using a new VSB. VSBs may also be allocated when the target of a branch instruction is determined by branch unit 325. Stream store 315 may include multiple portions that are used to store different types of PCs (e.g., entries for execute state load programs, entries for resulting PCs from load programs, and entries that can be allocated for longer programs that contain multiple steams). Information for streams that are currently decoded and placed in an L1 cache is referred to as an "active stream buffer" (ASB), and information for these streams is stored in active stream buffers 310.

Scheduling circuitry 220, in some embodiments, is configured to decide when to select VSBs to initiate fetching and decoding instructions to generate an ASB. This may allow the scheduling circuitry freedom to explore other paths of execution within shader programs, e.g., by sleeping threads for a period and later generating ASB(s) for those threads. Scheduling circuitry 220 may also replace ASBs with VSBs and then re-retrieve instructions using the VSB later. Scheduling circuitry may also control when ASBs are invalidated when invalidation is initiated by the memory subsystem. The VSB associated with that ASB may then be available to store a different PC. Scheduling circuitry 220 may also make scheduling decisions based on information in active stream buffers 310, as discussed in further detail below.

In some embodiments, scheduling circuitry 220 is configured to query active stream buffers 310 using an ASB number and an offset. Once it determines instruction type, the scheduling circuitry 220 may control L1 to L0 transfer circuitry 255 to move the instructions to the appropriate L0 cache.

In some embodiments, descriptor structures in the active stream buffers 310 are used for each clause to define characteristics of the clause such as type of instruction, offset in L1, size of the clause, etc. For datapath instructions, in some embodiments, there is also a pointer to a size list structure than indicates the size of each instruction in the clause.

In some embodiments, the clause descriptor structure is a union of multiple types and includes a field that identifies the type. For example, an active clause descriptor type may include the following fields, in some embodiments:

| | |
|---|---|
| pixwait_id | For synchronization instructions, e.g., as discussed in U.S. patent application No. 15/388,985 filed Dec. 22, 2016. This field may be used by the scheduler to determine whether threads should wait for pixel resources to be released before accessing the resources. |
| ldep | Dependency hint, may be used to indicate relationship to other clauses |
| num_instructions | Used for datapath clauses |
| data_flow | Indicates whether this is a datapath type clause |
| l1_offset | Used to determine location in L1 for copying from L1 cache to L0 cache |
| inst_type | Which L0 cache to write |
| inst_subtype | Specific instruction type for target L0 cache |
| inst_words | Size of clause in terms of memory words |

-continued

| | |
|---|---|
| pc_offset | Used to recover PC, e.g., by adding this offset to the initial stream PC. This may be used for performance profiling |
| active | Indicates whether active clause type |

A control flow active descriptor type may include the following fields, in some embodiments:

| | |
|---|---|
| ldep | Dependency hint, may be used to indicate relationship to other clauses |
| data_flow | False for this context |
| l1_offset | Used to determine location in L1 for copying from L1 cache to L0 cache |
| inst_type | Which L0 cache to write |
| inst_subtype | Specific functional unit attached to target L0 cache |
| inst_words | Size of clause in terms of memory words |
| pc_offset | Used to recover PC, e.g., for performance profiling |
| active | True for this context |

As another example, a datapath active descriptor type may include the following fields, in some embodiments:

| | |
|---|---|
| ldep | Dependency hint, may be used to indicate relationship to other clauses |
| inst_size_list_pointer | Can be N instruction size lists per clause, used to specify instruction sizes in order to transfer aligned instructions to L0 cache |
| num_instructions | Number of instructions in clause |
| data_flow | True for this context |
| l1_offset | Location of first math instruction in clause |
| inst_type | Common field due to union |
| inst_subtype | Common field due to union |
| inst_words | Size of clause in terms of memory words |
| pc_offset | Used to recover PC, e.g., by adding this offset to the initial stream PC. This may be used for performance profiling |
| active | True for this context |

An inactive descriptor type may simply return a VSB ID, in some embodiments. In other embodiments, any of various instruction descriptor structures may be implemented, the disclosed structures are included for purposes of illustration and are not intended to limit the scope of the present disclosure.

In some embodiments, the scheduling circuitry 220 is configured to make scheduling decisions based on the instruction characteristics of clauses stored in the active stream buffers 310. In some embodiments, the interface allows the scheduling circuitry 220 to present a stream ID and offset and receive the instruction type and subtype information needed to make a scheduling decision. For example, based on the amount of data in execution unit caches or pipelines, the scheduling circuitry 220 may decide to load data from an L1 instruction cache to an L0 cache for a type of execution unit that is less busy than the other types. For example, scheduling circuitry 220 may determine whether various thresholds are met for when to send work to different types of execution units. The scheduling circuitry may maintain a directory of which clauses have been loaded into the different L0 caches and may control MUXs 380 to control which clauses are actually executed. The scheduling circuitry may also make decisions about which clauses to evict or replace from the L0 caches based on active stream buffers 310. Further, the scheduling circuitry 220 may decide what streams to de-activate (e.g., such that they are handled as VSBs) or re-activate based on the types of instruction clause(s) in those streams. For example, the scheduling circuitry 220 may de-activate streams with types of instructions that target execution units that are already busy. Scheduling circuitry 220 may also take age of threads into account in scheduling.

In some embodiments, the inst_type field allows the scheduling circuitry to determine a type of execution unit (which may correspond to a particular L0 cache) that will execute the clause and the inst-subtype field allows the scheduling circuitry 220 to track work for specific functional units of that type (given that there may be multiple instances of various types of execution units, in some embodiments).

Exemplary Method

FIG. 4 is a flow diagram illustrating a method 400 for selecting instructions for execution based on their characteristics, according to some embodiments. The method shown in FIG. 4 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 410, in the illustrated embodiment, a graphics unit executes different types of graphics instructions using a plurality of different types of graphics execution units. The types of units may include datapath (e.g., math) units, sample units, interpolate units, load and/or store units, etc. There may be different subtypes among the execution units as well, e.g., the datapath units may include pipelines with ALUs of different widths and may include both integer and floating-point units. In some embodiments, a low-level instruction cache is assigned to each type of execution unit.

At 420, in the illustrated embodiment, a decoder decodes graphics instructions before storing the instructions at a particular cache level. For example, in the embodiments of FIG. 3 decoder 245 receives instructions from an L2 instruction cache and stores decoded instructions at an L1 cache level (the "particular" cache level, in this embodiment).

At 430, in the illustrated embodiment, the graphics unit stores decoded instructions in one or more instructions caches at the particular level. Caching decoded instructions may reduce power consumption, e.g., because instructions do not have to be decoded each time they are retrieved from the particular cache level.

At 440, in the illustrated embodiment, the graphics unit also stores information that specifies characteristics for sets of one or more of the decoded instructions (e.g., for clauses) in one or more storage elements. In the illustrated embodiment, the characteristics include at least which type of execution unit is configured to execute the set of one or more decoded instructions. For example, a sample unit is not configured to execute datapath instructions and vice versa. Therefore, datapath instructions have the characteristics that datapath units are configured to execute these instruction. The types of execution units to which different types of instructions are assigned may vary among different embodiments.

In some embodiments, the characteristics include one or more of: a particular type of instruction executed by the type of execution unit, a size of the instruction clause (e.g., in number of instructions, number of bytes/words, or both), a particular subtype of execution unit (e.g., a particular type of functional unit), dependency hints, profiling information such as program counter offset, etc.

In some embodiments, the one or more storage elements correspond to the one or more caches. Said another way, the information specifying characteristics of the instructions may be cached in the same cache with the decoded instructions. In various embodiments, however, storing the information in separate storage elements may reduce power consumption, e.g., by allowing the scheduling circuitry to schedule instructions by retrieving the information, without actually retrieving the decoded instructions until they are ready to send.

At 450, in the illustrated embodiment, scheduling circuitry selects instructions from the one or more instruction caches to send to ones of the plurality of execution units based on the shared information. The scheduling circuitry may send the instructions to an L0 cache corresponding to the selected execution unit(s). The scheduling circuitry may also send input data to be executed by ones of the clauses. Note that clauses in an L0 cache may be executed multiple times using different input data. In some embodiments, the scheduling circuitry may select instructions based on which the overall makeup of active and/or inactive instruction streams (e.g., what % of the instructions are datapath instructions), based on the types of a smaller subset of clauses, based on activity (e.g., L0 and/or pipeline status) of the different types of execution units, etc. The graphics unit may maintain one or more thresholds for the amount of work scheduled, but not yet completed, for each type of execution unit and/or one or more thresholds for the amount of work to be scheduled for each type of execution unit, and select instructions based on whether the thresholds are met for each type of execution unit. In some embodiments, this may reduce bottlenecks where the graphics unit waits for a particular type of execution unit before being able to execute other types of instructions.

Exemplary Device

Referring now to FIG. 5, a block diagram illustrating an exemplary embodiment of a device 500 is shown. In some embodiments, elements of device 500 may be included within a system on a chip. In some embodiments, device 500 may be included in a mobile device, which may be battery-powered. Therefore, power consumption by device 500 may be an important design consideration. In the illustrated embodiment, device 500 includes fabric 510, compute complex 520 input/output (I/O) bridge 550, cache/memory controller 545, graphics unit 580, and display unit 565. In some embodiments, device 500 may include other components (not shown) in addition to and/or in place of the illustrated components, such as video processor encoders and decoders, image processing or recognition elements, computer vision elements, etc.

Fabric 510 may include various interconnects, buses, MUX's, controllers, etc., and may be configured to facilitate communication between various elements of device 500. In some embodiments, portions of fabric 510 may be configured to implement various different communication protocols. In other embodiments, fabric 510 may implement a single communication protocol and elements coupled to fabric 510 may convert from the single communication protocol to other communication protocols internally.

In the illustrated embodiment, compute complex 520 includes bus interface unit (BIU) 525, cache 530, and cores 535 and 540. In various embodiments, compute complex 520 may include various numbers of processors, processor cores and/or caches. For example, compute complex 520 may include 1, 2, or 4 processor cores, or any other suitable number. In one embodiment, cache 530 is a set associative L2 cache. In some embodiments, cores 535 and/or 540 may include internal instruction and/or data caches. In some embodiments, a coherency unit (not shown) in fabric 510, cache 530, or elsewhere in device 500 may be configured to maintain coherency between various caches of device 500. BIU 525 may be configured to manage communication between compute complex 520 and other elements of device 500. Processor cores such as cores 535 and 540 may be configured to execute instructions of a particular instruction set architecture (ISA) which may include operating system instructions and user application instructions.

Cache/memory controller 545 may be configured to manage transfer of data between fabric 510 and one or more caches and/or memories. For example, cache/memory controller 545 may be coupled to an L3 cache, which may in turn be coupled to a system memory. In other embodiments, cache/memory controller 545 may be directly coupled to a memory. In some embodiments, cache/memory controller 545 may include one or more internal caches.

As used herein, the term "coupled to" may indicate one or more connections between elements, and a coupling may include intervening elements. For example, in FIG. 5, graphics unit 150 may be described as "coupled to" a memory through fabric 510 and cache/memory controller 545. In contrast, in the illustrated embodiment of FIG. 5, graphics unit 150 is "directly coupled" to fabric 510 because there are no intervening elements.

Graphics unit 150 may include one or more processors and/or one or more graphics processing units (GPU's). Graphics unit 150 may receive graphics-oriented instructions, such as OPENGL®, Metal, or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display. Graphics unit 150 may include transform, lighting, triangle, and/or rendering engines in one or more graphics processing pipelines. Graphics unit 150 may output pixel information for display images. In some embodiments, graphics unit 150 is configured to perform one or more of the memory consistency, mid-render compute, local image block, and/or pixel resource synchronization techniques discussed above.

Display unit 565 may be configured to read data from a frame buffer and provide a stream of pixel values for display. Display unit 565 may be configured as a display pipeline in some embodiments. Additionally, display unit 565 may be configured to blend multiple frames to produce an output frame. Further, display unit 565 may include one or more interfaces (e.g., MIPI® or embedded display port (eDP)) for coupling to a user display (e.g., a touchscreen or an external display).

I/O bridge 550 may include various elements configured to implement: universal serial bus (USB) communications, security, audio, and/or low-power always-on functionality, for example. I/O bridge 550 may also include interfaces such as pulse-width modulation (PWM), general-purpose input/output (GPIO), serial peripheral interface (SPI), and/or inter-integrated circuit (I2C), for example. Various types of peripherals and devices may be coupled to device 500 via I/O bridge 550.

Exemplary Computer-Readable Medium

The present disclosure has described various exemplary circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

FIG. 6 is a block diagram illustrating an exemplary non-transitory computer-readable storage medium that stores circuit design information, according to some embodiments. In the illustrated embodiment semiconductor fabrication system 620 is configured to process the design information 615 stored on non-transitory computer-readable medium 610 and fabricate integrated circuit 630 based on the design information 615.

Non-transitory computer-readable medium 610, may comprise any of various appropriate types of memory devices or storage devices. Medium 610 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Medium 610 may include other types of non-transitory memory as well or combinations thereof. Medium 610 may include two or more memory mediums which may reside in different locations, e.g., in different computer systems that are connected over a network.

Design information 615 may be specified using any of various appropriate computer languages, including hardware description languages such as, without limitation: VHDL, Verilog, SystemC, SystemVerilog, RHDL, M, MyHDL, etc. Design information 615 may be usable by semiconductor fabrication system 620 to fabrication at least a portion of integrated circuit 630. The format of design information 615 may be recognized by at least one semiconductor fabrication system 620. In some embodiments, design information 615 may also include one or more cell libraries which specify the synthesis and/or layout of integrated circuit 630. In some embodiments, the design information is specified in whole or in part in the form of a netlist that specifies cell library elements and their connectivity. Design information 615, taken alone, may or may not include sufficient information for fabrication of a corresponding integrated circuit. For example, design information 615 may specify the circuit elements to be fabricated but not their physical layout. In this case, design information 615 may need to be combined with layout information to actually fabricate the specified circuitry.

Semiconductor fabrication system 620 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 620 may also be configured to perform various testing of fabricated circuits for correct operation.

In various embodiments, integrated circuit 630 is configured to operate according to a circuit design specified by design information 615, which may include performing any of the functionality described herein. For example, integrated circuit 630 may include any of various elements shown in FIGS. 1-3, and/or 5. Further, integrated circuit 630 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
    a plurality of graphics execution units of a plurality of different types that are configured to execute different types of decoded graphics instructions;
    decode circuitry configured to at least partially decode graphics instructions before storing the graphics instructions at a particular cache level, wherein the decode circuitry is configured to store:
        resulting decoded instructions in one or more instruction caches at the particular cache level; and
        information that specifies characteristics for sets of one or more of the decoded instructions in one or more storage elements, wherein the characteristics include at least:
            the type of execution unit configured to execute the respective set of one or more decoded instructions;
    a plurality of dedicated instruction caches for respective types of execution units, including a first cache dedicated to caching instructions for execution by a first type of execution unit and a second cache dedicated to caching instructions for execution by a second, different type of execution unit, wherein the plurality of dedicated instruction caches are between the particular cache level and the execution units in a cache hierarchy; and
    scheduling circuitry configured to access the information in the one or more storage elements and select instructions from the one or more instruction caches to send for execution by ones of the plurality of execution units, wherein the selection is based on:
        the stored information that indicates the type of execution unit configured to execute the decoded instructions; and status information received for the first cache and the second cache.

2. The apparatus of claim 1, wherein the sets of one or more decoded instructions are clauses which the apparatus is configured to execute atomically once a given clause has been invoked for execution.

3. The apparatus of claim 1, wherein the apparatus is configured to store information for instruction streams, including:
storing initial program counters (PCs) for ones of the instruction streams;
maintaining a list of active streams having instructions that are at least partially decoded and for which information that specifies instruction characteristics has been stored in the one or more storage elements; and
executing a load shader instruction to allocate an entry for a shader program in the list of active streams.

4. The apparatus of claim 3, wherein the apparatus is configured to maintain a list of program counters for virtual streams for which information has not yet been stored in the one or more storage elements.

5. The apparatus of claim 1, wherein the different types of execution units further include at least two of: a sample unit, a datapath execution unit, interpolation circuitry, load circuitry, or store circuitry.

6. The apparatus of claim 1, wherein the scheduling circuitry is also configured to select instructions based on whether ones of the execution units have an amount of work scheduled that exceeds one or more thresholds.

7. The apparatus of claim 1, wherein the characteristics further specify a size of an instruction clause that includes the decoded instructions.

8. The apparatus of claim 1, wherein the characteristics further specify a particular functional unit in one of the plurality of execution units.

9. The apparatus of claim 1, wherein the apparatus is configured to store program counters for one or more streams of instruction for which decoded data is not currently stored in one or more instruction caches.

10. A method, comprising:
executing, by a plurality of graphics execution units of a plurality of different types, different types of graphics instructions;
decoding, by decode circuitry, graphics instructions before storing the graphics instructions at a particular cache level and storing:
resulting decoded instructions in one or more instruction caches at the particular cache level; and
information that specifies characteristics for sets of one or more of the decoded instructions in one or more storage elements, wherein the characteristics include at least: type of execution unit configured to execute the respective set of one or more decoded instructions, wherein a graphics unit that includes the graphics execution units includes a plurality of dedicated instruction caches for respective types of execution units, including a first cache dedicated to caching instructions for execution by a first type of execution unit and a second cache dedicated to caching instructions for execution by a second, different type of execution unit, wherein the plurality of dedicated instruction caches are between the particular cache level and the execution units in a cache hierarchy; and selecting, by scheduling circuitry, instructions from the one or more instruction caches to send for execution by ones of the plurality of execution units, wherein the selecting is based on:
the stored information that indicates the type of execution unit configured to execute the decoded instructions; and
status information received for the first cache and the second cache.

11. The method of claim 10, further comprising executing the sets of decoded instructions atomically using ones of the types of execution units when the sets of decoded instructions are invoked for execution.

12. The method of claim 10, further comprising storing information for instruction streams, including:
storing initial program counters (PCs) for ones of the instruction streams;
maintaining a list of active streams having instructions that are at least partially decoded and for which information has been stored in the one or more storage elements; and
executing a load shader instruction to allocate an entry for a shader program in the list of active streams.

13. The method of claim 10, further comprising maintaining a list of program counters for virtual streams for which information has not yet been stored in the one or more storage elements.

14. The method of claim 10, wherein the different types of execution units further include a datapath execution unit and a sample unit.

15. The method of claim 10, wherein the characteristics further specify a particular type of instruction executed by the type of execution unit.

16. A non-transitory computer readable storage medium having stored thereon design information that specifies a design of at least a portion of a hardware integrated circuit in a format recognized by a semiconductor fabrication system that is configured to use the design information to produce the circuit according to the design, including:
a plurality of graphics execution units of a plurality of different types that are configured to execute different types of decoded graphics instructions;
decode circuitry configured to at least partially decode graphics instructions before storing the graphics instructions at a particular cache level, wherein the decode circuitry is configured to store:
resulting decoded instructions in one or more instruction caches at the particular cache level; and
instruction information that specifies characteristics for sets of one or more of the decoded instructions in one or more storage elements, wherein the characteristics include at least: the type of execution unit configured to execute the respective set of one or more decoded instructions;
a plurality of dedicated instruction caches for respective types of execution units, including a first cache dedicated to caching instructions for execution by a first type of execution unit and a second cache dedicated to caching instructions for execution by a second, different type of execution unit, wherein the plurality of dedicated instruction caches are between the particular cache level and the execution units in a cache hierarchy; and
scheduling circuitry configured to access the instruction information in the one or more storage elements and select instructions from the one or more instruction caches to send for execution by ones of the plurality of execution units, wherein the selection is based on:

the stored information indicating the type of execution unit configured to execute the decoded instructions; and status information received for the first cache and the second cache.

17. The non-transitory computer readable storage medium of claim 16, wherein the circuit is configured to execute all instructions in a given set of instructions once the set has been invoked for execution.

18. The non-transitory computer readable storage medium of claim 16, wherein the circuit is configured to store information for instruction streams, including to:

store initial program counters (PCs) for ones of the instruction streams;

execute a load shader instruction to allocate an entry for a shader program; and maintain a list of active streams having instructions that are at least partially decoded and for which instruction information has been stored in the one or more storage elements.

19. The non-transitory computer readable storage medium of claim 18, wherein the circuit is configured to use the list of active streams as a directory to the instruction information in the one or more storage elements.

20. The non-transitory computer readable storage medium of claim 16, wherein the scheduling circuitry is configured to select instructions based further on whether ones of the execution units have an amount of work scheduled that exceeds one or more thresholds.

* * * * *